July 20, 1937. G. E. NELIN 2,087,778
CENTRIFUGAL MACHINE FOR FILTERING PURPOSES
Filed Feb. 4, 1936
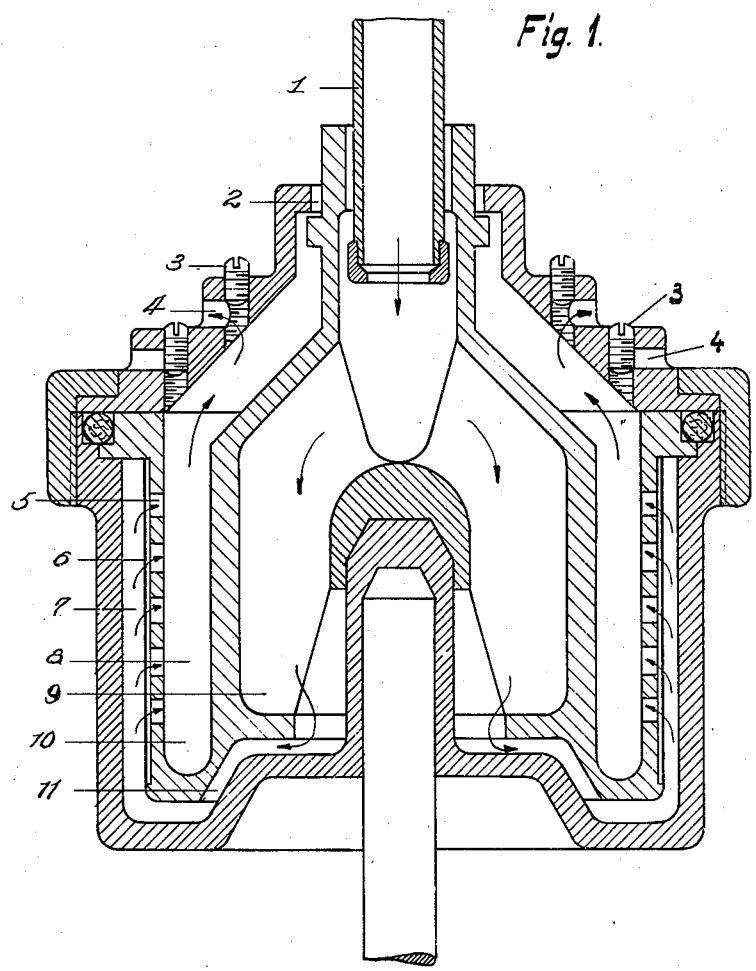
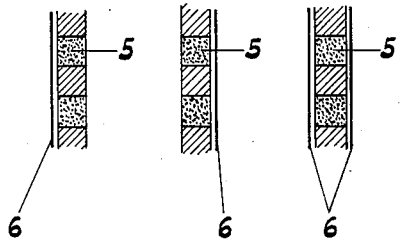
INVENTOR
Gustav Erik Nelin
BY Munn, Anderson & Liddy
ATTORNEYS Patented July 20, 1937

2,087,778

UNITED STATES PATENT OFFICE 2,087,778

CENTRIFUGAL MACHINE FOR FILTERING PURPOSES

Gustav Erik Nelin, Helsingfors, Finland, assignor to Kone ja Silta O. Y. Maskin och Bro A. B., Helsingfors, Finland Application February 4, 1936, Serial No. 62,299
In Finland January 7, 1936

4 Claims. (Cl. 210—64)

The increased claims with regard to high capacities have brought about that centrifugal machines for filtering purposes have in certain industries more and more replaced the old filtering methods in which the force which is necessary in order to overcome the counter-pressure of the filter is obtained by the own weight of the fluid or by pressure-pumps. Ahead of same, centrifugal machines offer the advantage that the pressure, influencing the capacity so essentially, can be easily increased in these machines to a nearly arbitrary degree. However, also in other respects the centrifugal machines are superior to the former, because fluids of different specific weight can be separated from each other, which cannot be effected by the other method. It is also possible to unburden the filter from the most coarse-grained impurities by constructing special slime spaces where the coarse-grained particles, being heavier than the fluid, deposit.

The disadvantage connected with the operations is the fact that the effective surface of the filter cannot be made sufficiently big so as to use fine filters at high capacities. In has, therefore, been necessary to reduce the claim on purity.

In the present invention this disadvantage has been remedied in such a way that an extra clear-filtering is effected by means of a powder-filter with more or less graniform particles.

In the accompanying drawing—

Figure 1 is a longitudinal vertical sectional view through a centrifugal machine disclosing an embodiment of the invention;

Fig. 2 is a fragmentary sectional view through one of the walls illustrated in Fig. 1 and showing the arrangement of filtering powder in the openings in the wall, the same forming certain features of the invention;

Fig. 3 is a view similar to Fig. 2 but showing a modified construction, and

Fig. 4 is a view similar to Fig. 2 but showing a second modified construction.

Through the pipe 1 the fluid which is to be separated enters into the bowl. In the fore-slimespace 9 the coarsest impurities deposit because, on account of their high specific weight, same are forced by the centrifugal power towards the periphery. The fore-slimespace 9 communicates by the channel 11 with the exterior slimespace 7 where, owing to the increased centrifugal power, the fluid is subject to a closer purification. From the slimespace 7 the fluid is pressed through the filter 6,—which is stretched out on the exterior of the wall 10, perforated by the holes 5,—to the space 8 and thence through the holes 4 and $4^1$ adjustable by the screws 3 and $3^1$ or through the opening 2 out of the bowl.

In Figs. 2, 3 and 4 different arrangements of filtering structures are presented. In Fig. 2 a filtering body 5 is arranged in various apertures 5 and a layer of cloth 6 is arranged on the outside of the wall, namely the side from which the liquid flows. In Fig. 3 a reverse arrangement is provided, namely the filtering medium 5 is arranged in a similar manner to that shown in Fig. 2 but the cloth 6 is arranged interiorly of the wall. In Fig. 4 a still further modified arrangement is shown wherein a layer of cloth is arranged on both sides of the wall.

If the separated fluid is permitted to leave the bowl after having passed through the filter cloth 6, the result is not perfectly good, particularly if it has been necessary to use a filter which is not very tight so as to obtain a tolerably big capacity, even with fluids of high viscosity. The idea of the invention described above consists therein that the fluid subject to purification has also to pass through a powder filter which most suitably is effected by putting a powder of higher specific weight,—mixed up with the fluid,—into space 8 where same is separated when the bowl is rotating and is deposited on the interior of the wall 10, whereby also the holes 5 are filled up.

Within the powder the fluid is now subject to a close purification, which does not only consist of the filtration effect created between the particles of the mass and known from ordinary pressure filters, but even is caused by a separation of another kind, taking place within the mass. On account of the adhesion to the particularly wide total surface of the powder-mass, created by its being so fine-grained, the fluid is forced, even at great speeds, to pass in a laminated way through the powder. During this laminated passing the centrifugal power effects a separation like the one which takes place within ordinary bowls equipped with insertion plates. The heavier particles are forced to move outwards a short way in radial direction until they stick on to the surface of some grain.

This process is most important because in the majority of fluids there is mixed up in almost colloidal state some other fluid of heavier specific weight (e. g. water in olive oil) which then, even in extremely small quantities can greatly change the appearance of the mass. These impurities mixed up with the fluid cannot be separated by means of an ordinary filter, but certainly by a powder filter through which under the influence of the centrifugal power the fluid, which is to be separated, is passing. When separating certain fluids it is of advantage to insert a powder which chemically reacts as e. g. at the extraction of color from some lacquers.

It is certainly possible to carry out the above described idea in countless forms of constructions, all of which, of course, cannot be mentioned within the limited space of this description.

In order to be able to reduce the outlet speed and at the same time also the energy used for separation with such powders and such capacities which do not require the maximum of the fluid-pressure which is at hand, the holes 4 and 4¹ are arranged at different distances from the centre, which holes can be opened and closed by means of the screws 3 and 3¹.

I claim:

1. A centrifugal filtering machine including a casing, means within the casing forming a chamber provided with a bottom having an outlet, a solid inner wall upstanding from said bottom, an outer foraminous wall upstanding from said bottom, said foraminous wall being spaced from said casing and said inner wall and acting as an inlet to the space between said inner and outer walls, said outlet from the bottom of the bowl being in free communication with the space between the casing and the foraminous wall, a filtering powder arranged in each of the openings in said foraminous wall, and a sheet of filtering cloth positioned on each side of said wall so that the liquid passing through said foraminous wall must first pass through one filtering cloth, then through the filtering powder, and finally through the second filtering cloth.

2. A centrifugal filtering machine comprising a casing, a bowl arranged within said casing, said bowl being formed with an inner chamber having an inlet at the top and an outlet at the bottom, said bowl being also provided with an outer chamber surrounding said inner chamber, the enclosing wall of said inner chamber being solid throughout and forming the inner wall of said outer chamber, said outer chamber being formed with a foraminous outer wall connected at its lower edge with the lower edge of said enclosing wall, said bowl being spaced from said casing except at the upper end with the space between the casing and the outer wall of the bowl being in free communication with said outlet, and a filtering member positioned in each of the openings in said outer wall, said outer wall being positioned so that all liquid flowing through said outer wall into said outer chamber must flow through the filtering members.

3. A centrifugal filtering machine comprising a liquid tight casing having a displacement member extending upwardly from the bottom centrally thereof, a cover member for said casing formed with liquid discharge openings, a bowl arranged in said casing positioned out of contact therewith except at the top portion of said displacement member and the top peripheral edge of the casing, said cover member acting to clamp said bowl to said peripheral edge, said bowl being formed with an inlet at the top and a bottom spaced from the bottom of the casing and having an opening around said displacement member, and a pair of spaced upstanding walls adjacent the periphery of the bottom, the outer of said upstanding walls being spaced from said casing and formed with openings therein, and a filtering material positioned in each of said openings with the space between said upstanding walls being in free communication with said liquid discharge openings in said cover.

4. A centrifugal filtering machine including a liquid tight casing, a cover for said casing having liquid discharge openings, a bowl arranged in said casing and formed with an inlet at the top and a bottom spaced from the bottom of the casing, the bottom of the bowl having a centrally positioned opening and a pair of upstanding walls adjacent the periphery of the bottom, the inner of said upstanding walls being solid throughout while the outer of said upstanding walls is spaced from said casing and formed with apertures therein, and a filtering material positioned in each of said apertures with the space between said upstanding walls being in free communication with said liquid discharge openings in said cover.

GUSTAV ERIK NELIN.